UNITED STATES PATENT OFFICE.

JOHN MacNAULL WILSON, OF MONTCLAIR, NEW JERSEY; CORA ELLSWORTH WILSON EXECUTRIX OF SAID JOHN MacNAULL WILSON, DECEASED.

COMPOSITION FOR CLEANING AND COATING.

1,401,023.  Specification of Letters Patent.  Patented Dec. 20, 1921.

No Drawing. Original application filed March 7, 1919, Serial No. 281,304. Divided and this application filed January 26, 1921. Serial No. 440,176.

*To all whom it may concern:*

Be it known that I, JOHN MACNAULL WILSON, a citizen of the United States, residing at Montclair, in the county of Essex, State of New Jersey, have invented certain new and useful Improvements in Compositions for Cleaning and Coating, (division of Serial No. 281,304, filed March 7, 1919, now patent No. 1,372,988;) and I do hereby declare the following to be a full, clear, and exact description of the invention, such as will enable others skilled in the art to which it appertains to make and use the same.

My invention relates to a cleaning material, and has among other objects the purpose of increasing efficiency in cleaning the surface of cars and the like, preserving and restoring the finish thereof and leaving it in a brilliant condition comparable with its original appearance.

Further objects and advantages of my invention will be apparent, by reference to the following specification in which the best modes of procedure according to my invention are described.

The surface of railway passenger cars become more or less discolored and stained in service and must be cleaned periodically to present a reasonably pleasing appearance, as well as an economic measure to preserve the varnished surface and reduce expense of repainting. Various expedients have been resorted to in the treatment of such surfaces. Alkalies and soapy mixtures suggest themselves but are particularly damaging to varnished surfaces and are therefore to be avoided. Water alone is inefficient since it removes only superficial dust or dirt leaving oil, grease or other stains to accumulate. Neutral oil and grease cleaners with or without abrasives are only effective when the surface is energetically scrubbed therewith, which increases labor expenses. Neutral oil and grease cleaners, moreover, leave a moist non-drying finish, only serving to attract and hold more dust and dirt, which with gas absorbed eventually stains the surface. Solutions of oxalic acid in water have been tried but are detrimental to the varnished surface unless the latter is thoroughly rinsed. The problem of cleaning windows is also present and none of the foregoing means is suitable for this purpose, having in mind the adjacent varnished surfaces which are more or less injured by careless use of the cleaning materials.

I have discovered that suitable acid solutions may be safely and efficiently used in conjunction with a novel cleaning composition or emulsion which I have devised, and which I herein claim. This composition or emulsion is of a character which neutralizes any free acid remaining after the preliminary treatment therewith and, in addition, differing from oil, provides a drying body comparable with varnish, which preserves the varnished surface and leaves it in a condition approximating its original brilliancy.

My composition is, moreover, of a nature which permits of its use alone as a detergent, so that it may be employed without acid to clean varnished and similar surfaces. It may be used successfully upon windows without preliminary treatment with oxalic acid and when the latter is employed the subsequent treatment with my composition or emulsion neutralizes the acid and insures the preservation and restoration of the surrounding varnished surfaces. A composition or emulsion which I have found to be well adapted to accomplish the desired results may comprise certain ingredients, hereinafter specified, for which various equivalents may be substituted. Other changes, such as the omission of one or more of the ingredients or variation of the proportions thereof, may be made without departing from the invention, it being essential only that the composition or emulsion has the properties of acting as a cleansing agent and providing a drying body capable of producing a dry glossy finished surface. When used in connection with a preliminary treatment with suitable acid, the composition or emulsion should also be capable of neutralizing any such acid remaining on the surface.

My composition or emulsion being capable of use either with or without preliminary treatment with oxalic or other acid, having detergent properties, may obviously be used in connection with cleaning agents, other than oxalic acid, and such use is contemplated by me. It is my intention, therefore, to include in this application the composition or emulsion with such variations in its composition as may be expedient, having in mind its intended purpose and the variation in the character of surfaces to which it may be applied. Such composition or emulsion, can be used either alone or in connection with a preliminary treatment, with oxalic acid or other cleaning material.

In order that my invention may be fully understood and practised, without recourse to experiment, I shall describe a composition or emulsion which has proven entirely successful in the practical application of my invention, together with an example of its application. It is to be understood that such description is by way of example only and is not to be considered as the sole available composition or method of applying the same.

My composition or emulsion may comprise, for example, the following ingredients in the proportions mentioned:

| | |
|---|---|
| Pine oil | 15.5% |
| Paraffin or mineral oil | 53.0% |
| Lime soap made from whale oil | 13.5% |
| Turpentine | 5.5% |
| Water | 13.0% |

A suitable proportion of mineral abrasive or pulverized soap bark may, if desired, be included in the composition.

Such a composition, the ingredients of which are thoroughly incorporated or emulsified, is itself a detergent and may be used for cleansing surfaces of various kinds. It embodies sufficient oil of a drying character to form a brilliant film on a varnished surface. This film is substantially water and weather proof, does not collect and hold dust, and when the original varnish is not wholly destroyed, treatment with the composition or emulsion will restore the varnish to substantially its original condition.

In the preferred mode of employing my composition or emulsion, the surface to be cleaned is first treated with a solution of oxalic or equivalent detergent acid or cleansing agent. This treatment loosens the dirt and stains without scrubbing or other laborious treatment. After the acid has remained on the surface for a short period and preferably before drying, the surface is coated with the composition or emulsion. This surface is then wiped clean with waste or other suitable material, leaving the surface clean and dry and with a permanent high gloss which has the appearance of a fresh coat of varnish.

The composition or emulsion destroys the acid remaining on the surface, so that it can have no deleterious effect upon the varnish or metal construction of the car. It is not, therefore, essential to rinse the surface with water following the treatment with acid. Nevertheless, rinsing may be practised, if considered desirable, and will not adversely affect the results accomplished with the emulsion following.

Under certain conditions, as where the surface is badly discolored, it is expeditious and desirable to mechanically brush the surface treated. A brush suitable for such work is disclosed in U. S. Patent Number 1,333,146 issued to me March 9th, 1920.

In an embodiment of my method, the surface, after preliminary treatment with oxalic acid or other acid or cleanser, is brushed, as with a hand scrubbing brush, until all dirt and stains have been removed. The surface is then, either following or without rinsing, coated with the composition or emulsion herein described or its equivalent and immediately wiped off with the waste or other suitable material leaving a dry highly polished surface.

My invention is particularly useful in carrying out the cleaning of car surfaces during the winter months. Such work is generally carried out in unheated buildings or possibly in yards, and during periods of low temperatures the possibility of freezing precludes the use of water in cleaning operations. Under such conditions I preferably mix with the acid solution a relatively slight percentage of commercial glycerin, for example, 2 to 4 ounces per gallon of solution. I have discovered that the addition of glycerin to the solution precludes freezing in the coldest weather and also retards drying of the solution thus permitting it to more effectively accomplish its purpose. The prevention of freezing is highly important in cold weather as it materially reduces the labor required in cleaning cars. The addition of glycerin is equally advantageous in summer to retard drying of the acid solution. When the acid solution containing glycerin is employed, it may be followed by a treatment with the composition or emulsion hereinbefore described. If there is danger of freezing intermediate rinsing with water is omitted. In warmer weather an intermediate rinse with water may be employed or not as desired. As will be noted, my method requires no water for the successful cleaning and restoring of car surfaces. Thus, the most difficult problems in car cleaning are fully met by my invention in eliminating water and establishing a high and dry gloss on the finished surface likewise in neutralizing the possible corrosive action of acid.

Various modifications of the emulsion composition and mechanical method described herein will suggest themselves in the application of my invention under peculiar conditions, which may arise from time to time in cleaning surfaces of varying character. Such modifications, within the scope of the appended claims, may be made with-

I claim:—

1. A composition for cleaning and coating varnished surfaces and the like, including an alkaline earth soap combined with a drying body capable of producing a glossy film on the surface treated.

2. A composition for cleaning and coating varnished surfaces and the like, including an alkaline earth soap combined with a drying oil capable of producing a glossy film on the surface treated.

3. A cleaning emulsion including a drying oil, an alkaline earth soap and water.

4. A cleaning emulsion including pine oil, a soap and water.

5. A cleaning emulsion including pine oil, a mineral oil, soap and water.

6. A cleaning emulsion including pine oil, a mineral oil, a lime soap and water.

7. A cleaning emulsion including pine oil, a mineral oil, soap, a drying agent and water.

8. A cleaning emulsion including pine oil, a mineral oil, lime soap, a drying agent and water.

9. A cleaning and coating composition including the following ingredients in substantially the proportions named:

| | |
|---|---|
| Pine oil | 15.5% |
| Mineral oil | 53.0% |
| Lime soap | 13.5% |
| Turpentine | 5.5% |
| Water | 13.0% |

Substantially insoluble soap.

In testimony whereof I affix my signature.

JOHN MacNAULL WILSON.